INVENTOR.
FRANK KUSSY
WALTER T. GARTON

March 9, 1965 F. KUSSY ETAL 3,173,063
ELECTRIC CIRCUIT BREAKER AND PANELBOARD THEREFOR
Filed July 27, 1960 3 Sheets-Sheet 2

INVENTOR.
FRANK KUSSY
WALTER T. GARTON
BY Thomas F. Kirby

March 9, 1965 F. KUSSY ETAL 3,173,063
ELECTRIC CIRCUIT BREAKER AND PANELBOARD THEREFOR
Filed July 27, 1960 3 Sheets-Sheet 3

INVENTOR.
FRANK KUSSY
WALTER T. GARTON
BY Thomas F. Kirby

3,173,063
ELECTRIC CIRCUIT BREAKER AND PANELBOARD THEREFOR

Frank Kussy, Birmingham, Mich., and Walter T. Garton, Holland Park, London, England, assignors to Square D Company, Park Ridge, Ill., a corporation of Michigan
Filed July 27, 1960, Ser. No. 45,702
5 Claims. (Cl. 317—119)

This invention relates generally to electric circuit breakers and panelboards therefor. More particularly, it relates to means for preventing molded case type circuit breakers of given electrical rating from being readily attached to or detached from a mounting panel assembly within an enclosure box.

Molded case type circuit breakers formerly were constructed so that those of different electrical rating had the same physical configuration and were interchangeable with each other on a mounting panel assembly within an enclosure box. This permitted intentional or inadvertent substitution of high rated circuit breakers for those of lower rating. Safety code regulations now require that circuit breakers and the mounting panel assemblies therefor be constructed so that such substitutions cannot be readily carried out by unauthorized or inexperienced personnel.

These regulations contemplate that circuit breakers of relatively high electrical rating cannot be attached to or removed from the mounting panel assembly unless special tools are employed and/or unless the mounting panel assembly is substantially removed from its enclosure box, it being unlikely that unauthorized or inexperienced personnel would have the initiative or ability to carry out such a task. However, these regulations further contemplate that low-rated circuit breakers, such as those rated at 15 or 20 amperes, should be readily replaceable by those of like rating.

Accordingly, it is an object of this invention to provide improved circuit breakers and mounting panel assemblies therefor which comply with the aforesaid safety code regulations and which retain the many advantages afforded by former apparatus.

Another object is to provide improved mounting panel assemblies having means which interfere with attachment and detachment of improved circuit breakers of higher rating under certain conditions but which do not interfere with circuit breakers of lower rating.

Still another object is to provide a mounting panel assembly having means of the aforesaid character which are movable or removable to permit attachment or detachment of the circuit breakers of higher rating only when the mounting panel assembly is substantially displaced from its enclosure box.

A further object is to provide improved circuit breakers for use with mounting panel assemblies of the aforesaid character.

A further object is to provide improved means of the aforesaid character which can be employed with mounting panel assemblies and circuit breakers of present design after relatively minor changes are made in the construction of such apparatus.

An even further object is to provide apparatus made in accordance with the invention which is reliable in use, tamperproof, relatively economical to manufacture, and well adapted to mass production techniques.

Other objects and advantages of the invention will hereinafter appear.

The drawings illustrate preferred embodiments of the invention which will hereinafter be described in detail, it being understood that the embodiments illustrated are susceptible to modification with respect to certain details thereof without departing from the scope of the appended claims.

Figure 1:
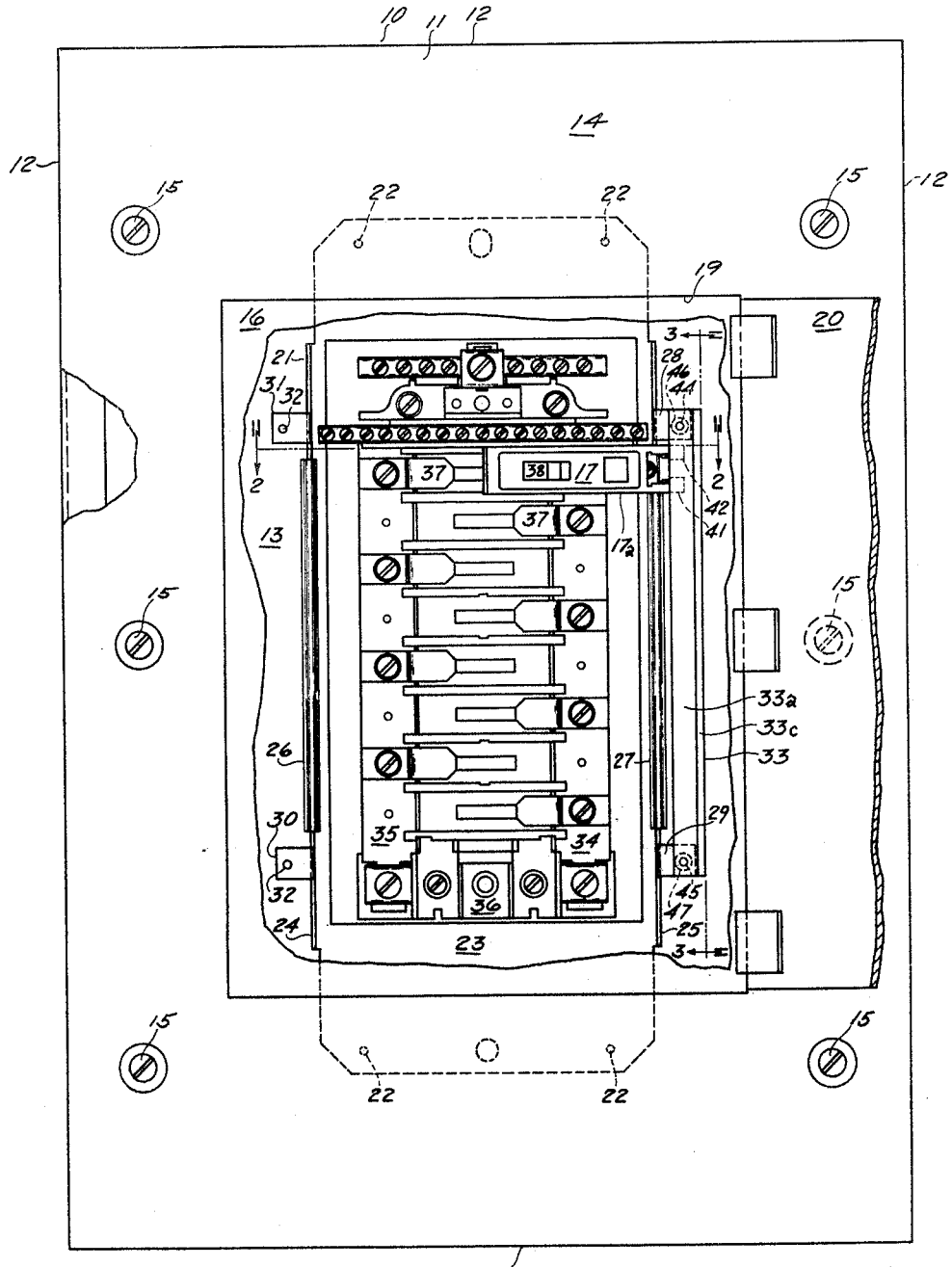
FIG. 1 is a front elevational view of an electrical panelboard which comprises an enclosure box, a mounting panel assembly mounted therewithin and having a locking bar thereon constructed in accordance with the invention, and a circuit breaker constructed in accordance with the invention.
Figure 2:
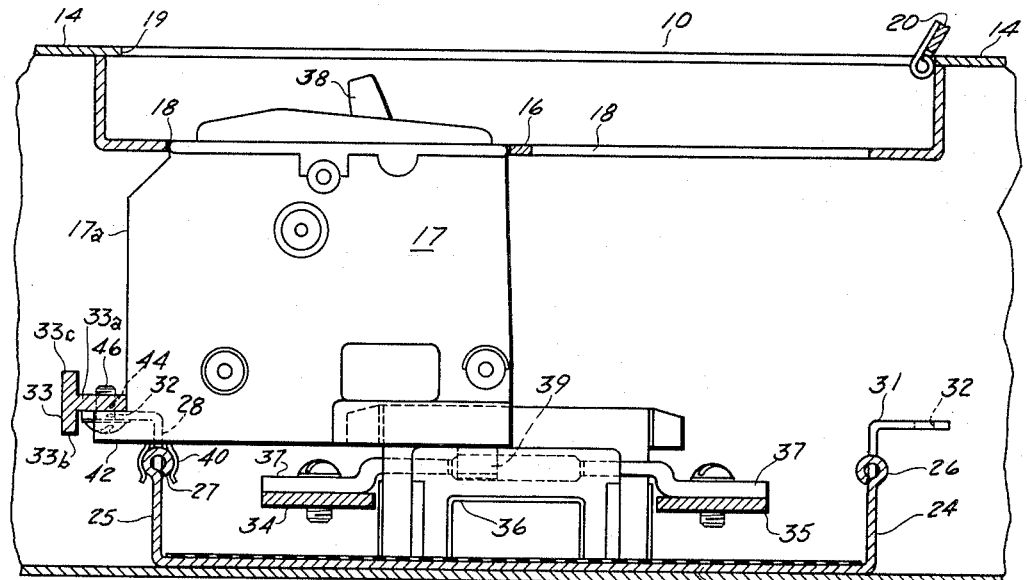
FIG. 2 is an enlarged elevational view, partly in section, taken along 2—2 of FIG. 1.

Referring to FIGS. 1 and 2, the numeral 10 designates an electrical panelboard. The panelboard 10 comprises a metal enclosure box 11 which has side walls 12 and a back wall 13. A trim member or cover 14 is secured to the enclosure box 11 by the screws 15 which take into threaded clamps (not shown) within the enclosure box. The trim member or cover 14 overlies a hopper member 16 which, as FIG. 2 best shows, is associated with the top of a circuit breaker 17 and is provided with openings such as 18 through which other circuit breakers (not shown) such as 17 project. The trim member or cover 14 is provided with a frontal opening 19 which is closable by a hinged door 20 which is supported by the trim member. In FIG. 1, portions of the hopper member 16 have been cut away for purposes of illustration.

Figure 3:
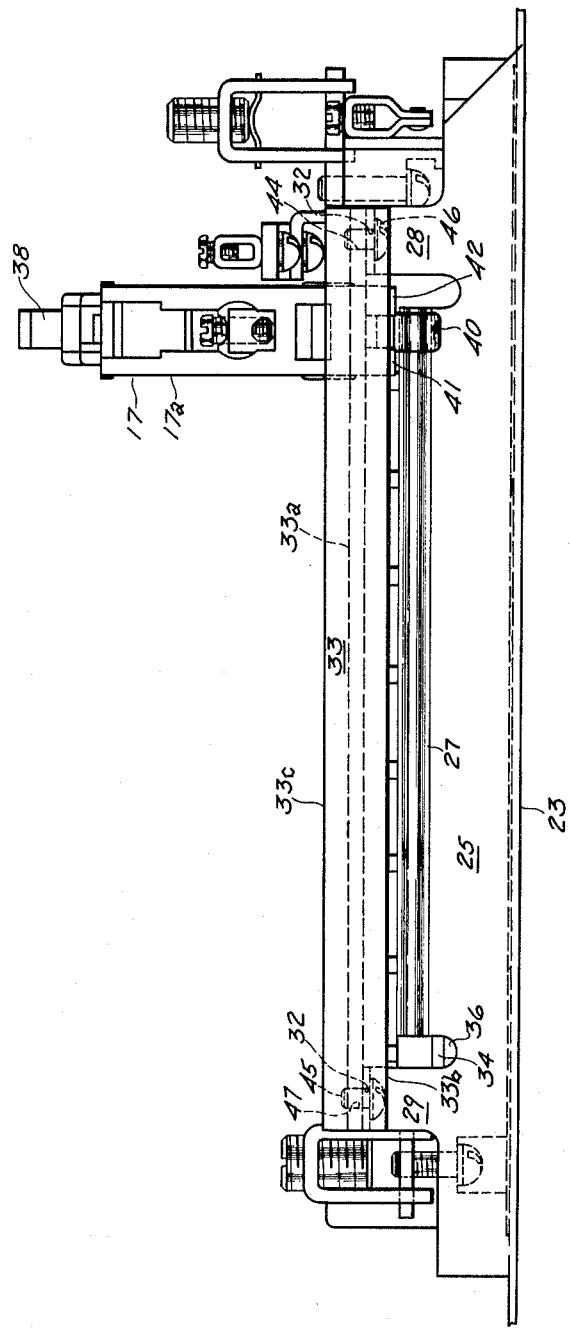
FIG. 3 is an enlarged elevational view taken along line 3—3 of FIG. 1.

FIGS. 1, 2 and 3 show a mounting panel assembly 21 which is adapted to be secured, by suitable means such as the screws 22 (FIG. 1), to the back 13 of the box 11 and which is removable therefrom. It is to be understood that the mounting panel assembly 21 is adapted to support two parallel rows of eight circuit breakers of the molded case type, but only one such circuit breaker is shown mounted thereon. The mounting panel assembly 21 comprises a sheet-metal pan 23 having side edges which are bent to provide a pair of spaced-apart parallel flanges 24 and 25 which are provided with the rolled-over bead portions 26 and 27, respectively, which function as elements of a mounting system for the circuit breakers which are mountable thereon.

The mounting panel assembly 21 further comprises a pair of longitudinally extending bus bars 34 and 35 which are mounted in spaced parallel relationship with respect to each other upon an insulating support 36 which is suitably secured to the pan 23 by means not shown. A plurality of terminal connectors 37, each of which is electrically and mechanically connected to one of the bus bars 34 or 35 in alternate arrangement lengthwise of the mounting panel assembly 21, extend transversely from their respective associated bus bar toward the other bus bar to define longitudinally spaced mounting areas for the circuit breakers which are to be disposed on the mounting panel assembly 21 and to provide for electrical connection for each of such circuit breakers to one of the bus bars 34 or 35.

The pan 23 of the mounting panel assembly 21 is modified in accordance with the invention by the provision thereon of integrally formed L-shaped bracket members such as 28 and 29 which are provided near the opposite ends of the flange 25 and the L-shaped members 30 and 31 near the opposite ends of the flange 24. If preferred, the bracket members could have some other configuration and could be discrete members which are welded or otherwise secured to the pan. Each L-shaped bracket member 28, 29, 30 and 31 is provided with an untapped hole 32 in the respective flat portions thereof which is perpendicular to the flanges of the pan 23. The L-shaped members 28 and 29 are adapted to have a locking bar 33, hereinafter described, secured thereto. The L-shaped members 30 and 31 are adapted to have a locking bar (not shown) similar to the locking bar 33 secured thereto. It is preferred to dispose the locking bars along the side edges of the mounting panel assembly 21 so that each locking bar is associated with only one row of circuit breakers on the mounting panel assembly and can be swung clear of that row without being hampered in movement by the other row of breakers.

Figure 6:
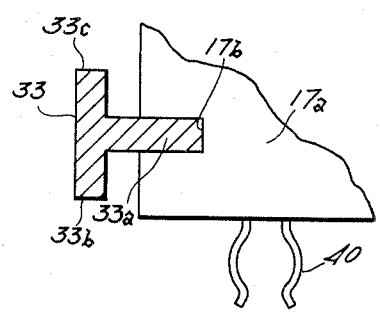
FIG. 6 is a view of a portion of an alternative type of circuit breaker constructed in accordance with the invention.

The circuit breaker 17, which is shown mounted on the mounting panel assembly 21 and may be assumed to be rated at 50 amperes, comprises a case 17a which is preferably fabricated by molding from electrical insulating material and wherein is disposed a suitable circuit breaker mechanism (not shown). The circuit breaker 17 is provided with an operating handle 38 which extends from the top of the case 17a with an electrically conductive spring jaw clip 39 (FIG. 2) which extends outwardly of the bottom of the case 17a and is adapted to make mechanical and electrical engagement with the terminal connector 37 on the mounting panel assembly 31, and with a spring mounting clip 40 (FIGS. 2 and 3) which extends outwardly of the bottom of the case 17a and is adapted to mechanically engage the bead portion 27 of the flange 25 of the pan 23 of the mounting panel assembly 21. The circuit breaker 17 is substantially identical, except as hereinafter explained, to a type of circuit breaker disclosed in Patent No. 2,902,560 to Stanback et al., issued September 1, 1959 to the same assignee as the present invention. In accordance with the present invention, the case 17a of the circuit breaker 17 is provided at the rear thereof with discriminating means such as a pair of integrally formed projections 41 and 42 having top surfaces which are preferably flat and which, when the circuit breaker 17 is mounted on the mounting panel assembly 21, lie in the same plane as the top surface of the flat portions of the L-shaped members 28 and 29. If preferred, instead of two projections 41 and 42, a single projection could be employed. Furthermore, the projection or projections need not necessarily be part of the insulating case 17a but could be fabricated of metal or other material and suitably secured to the case 17a as by entrapment, riveting or other means. Then too, if desired, instead of projections the circuit breaker case 17a could be provided with a slot 17b which is adapted to accommodate the portion 33a of the locking bar 33, as FIG. 6 shows.

The locking bar 33, hereinbefore referred to, is an elongated member, preferably fabricated of metal, having a T-shaped cross sectional configuration, as FIG. 2 best shows. The portion 33a of the locking bar 33 is provided with tapped holes 44 and 45 near opposite ends thereof, which, when the locking bar 33 is properly associated with the mounting panel assembly 21, register with the holes 32 in the flat portion of the L-shaped members 28 and 29, respectively, and are adapted to engage the screws 46 and 47 respectively. The screws 46 and 47, the shanks of which should be as short as practical in view of the thickness of the L-shaped members and the portion 33a of the locking bar 33, are inserted from behind the flat portion of the L-shaped members 28 and 29. The screws 46 and 47 have a standard slotted head, as shown. It is preferred to employ a locking bar 33 having a T-shaped cross-sectional configuration because the portion 33b of the bar 33 serves to conceal the heads of the scews 46 and 47 and to render them inaccessible for removal unless the entire panel assembly 21 is removed from the enclosure box 11. The portion 33c of the locking bar 33 similarly renders the extending shanks of the screws 46 and 47 inaccessible. It is to be noted that the flat end surface of the portion 33a of the locking bar 33 abuts the end wall of the case 17a of the circuit breaker 17 and thus prevents the circuit breaker from being pivoted in a counterclockwise direction (with respect to FIG. 2) to defeat the locking function of the bar 33.

Figure 4:
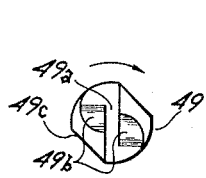
FIG. 4 is an enlarged end view of the head of a "one-way" screw which may be employed with the locking bar assembly shown in FIGS. 1, 2 and 3.

If preferred, instead of the screws 46 and 47, so-called "one-way" screws, such as 49, which is provided with a type of head shown in FIG. 4, may be employed. The head of the "one-way" screw 49 is provided with a slot 49a which permits it to be rotated in the direction of the arrow by means of an ordinary screw driver (not shown) but the sloped surfaces 49b prevent its rotation in the opposite direction unless a tool is employed which engages the plate 49c.

Figure 5:
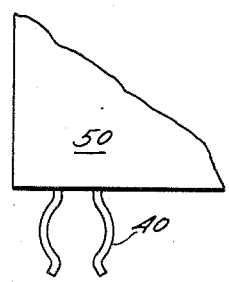
FIG. 5 is a view of a portion of another circuit breaker which may be employed on the mounting panel assembly shown in FIGS. 1, 2 and 3.

FIG. 5 shows a portion of another circuit breaker 50 which is adapted to be employed on the mounting panel assembly 21. It is to be understood that the circuit breaker 50 is substantially identical to the circuit breaker 17, hereinbefore described, but differs therefrom in that it has a lower electrical rating, i.e., may be rated at 15 amperes, and is not provided with projections such as the projections 41 and 42 on the case 17a of the circuit breaker 17.

The invention is employed as follows.

The mounting panel assembly 21 is removed from the enclosure box 11 and the circuit breaker 17 is then attached thereto as shown. The locking bar 33 is then associated with the L-shaped members 28 and 29 on the pan 23 of the mounting panel assembly 21 and the screws 46 and 47 are inserted from the rear of the L-shaped members, through the holes 32 therein, and are turned into the threaded holes 44 and 45 in the bar 33 so as to secure the latter to the mounting panel assembly 21. The panel assembly 21 is then placed within the enclosure box 11 and is secured to the rear wall 13 thereof by the screws 22. The hopper member 16 and the trim member 14 are then put in place. It is apparent, however, that if the trim member 14 and hopper member 16 are subsequently removed, that the circuit breaker 17 cannot be unplugged or removed from the mounting panel assembly 21 because the portion 33a of the locking bar 33 interferes with the projections 41 and 42 formed on the case 17a of the circuit breaker 17. Furthermore, it is apparent that a circuit breaker such as 17 cannot be attached to a vacant position on the mounting panel assembly 21 on the side thereof to which the locking bar 33 is attached because the projections 41 and 42 will interfere with the portion 33a of the locking bar 33 and the clip 40 cannot then properly engage the beaded portion 27 of the flange 25 of the pan 23 of the mounting panel assembly 21.

It is to be understood that the circuit breaker shown in FIG. 6 cooperates in a similar manner with the locking bar 33.

However, the circuit breaker 50 shown in FIG. 5 can be readily attached to or removed from a position on the mounting panel 21 on the side thereof to which the locking bar 33 is attached even when the locking bar 33 is in place because the circuit breaker 50 is not provided with projections such as 41 and 42 which would interfere with the locking bar 33.

As long as the mounting panel assembly 21 is secured within the enclosure box 11, the heads of the screws 46 and 47 are virtually inaccessible for removal with normal tools. The provision of the portion 33b on the locking bar 33 conceals the heads of the screws 46 and 47 and renders them even more inaccessible. The portion 33c on the locking bar 33 by being relatively close to the rear of the case 17a of the circuit breaker 17 tends to interfere with the insertion of a tool, such as a pliers (not shown), in an attempt to engage the shanks of the screws 46 and 47 to effect removal thereof. It is extremely unlikely that an unauthorized or unskilled person will have the initiative to attempt to remove the panel assembly 21 from the enclosure box 11 in order to effect replacement of a circuit breaker such as 17.

It is apparent that if screws such as 49 in FIG. 4 are employed instead of the screws 46 and 47, then even after the mounting panel assembly 21 is removed from the enclosure box 11, the locking bar 33 cannot be disengaged unless a special tool (not shown) is employed to remove the screws. This arrangement would further tend to prevent tampering with the circuit breakers since such tools are not generally available. Furthermore, the proximity of the portion 33b of the locking bar 33 to the head 49 of a "one-way" screw prevents use of ordinary pliers (not shown) to effect removal of the screw.

It is a feature of the invention that when the mounting panel assembly 21 is removed from the enclosure box, one of the screws 46 or 47 (or one of the screws similar to the screw 49 if such are employed) may be removed entirely and the other merely loosened, thus permitting the locking bar 33 to be pivoted on the loosened screw and swung away from the edge of the mounting panel assembly 21 to permit removal or attachment of the breaker 17. Such an arrangement tends to prevent loss or misplacement of parts and is convenient for the person working on the panel assembly 10. If preferred, one end of the locking bar 33 could be permanently and pivotally attached to one of the L-shaped members 28 or 29 as by a rivet (not shown) instead of a screw and the locking bar 33 could be swung aside when the screw at the other end was removed.

Furthermore, if preferred, the holes 32 in the L-shaped members 28 and 29 on the pan 23 of the mounting panel assembly 21 could be tapped or threaded, and the screws 46 and 47 could then be employed as described hereinbefore but it would then be unnecessary to remove the panel assembly from the enclosure box to gain access to the screws, although a special tool would still be required.

What is claimed is:

1. An electrical panelboard for circuit breakers comprising a box including a back wall, a circuit breaker mounting panel assembly removably secured to said back wall within said box, and a locking bar removably secured to said mounting panel assembly, said locking bar when so secured preventing mounting and removal of circuit breakers of a first casing configuration on and from said mounting panel assembly and permitting mounting and removal of circuit breakers of a second casing configuration on and from said mounting panel assembly.

2. An electrical panelboard for circuit breakers comprising a box including a back wall, a circuit breaker mounting panel assembly removably secured to said back wall within said box, a locking bar removably secured to said mounting panel assembly, said locking bar when so secured preventing mounting and removal of circuit breakers provided with discriminating means in accordance with the electrical rating thereof on and from said mounting panel assembly and permitting mounting and removal of other circuit breakers on and from said mounting panel assembly, and means preventing removal of said locking bar from said mounting panel assembly when said mounting panel assembly is secured to said back wall.

3. An electrical panelboard as claimed in claim 2, wherein said locking bar is secured to said mounting panel assembly by means including a screw inserted from the rear of said mounting panel assembly.

4. An electrical panelboard for circuit breakers comprising a box including a back wall, a circuit breaker mounting panel assembly removably secured to said back wall within said box, a locking bar mounted adjacent one end on said mounting panel assembly for pivotal movement between a first position and a second position with respect to said mounting panel assembly and removably secured adjacent the other end to said mounting panel assembly to maintain said locking bar in said first position, said locking bar in said first position preventing mounting and removal of circuit breakers provided with discriminating means in accordance with the electrical rating thereof on and from said mounting panel assembly and permitting mounting and removal of other circuit breakers on and from said mounting panel assembly, and means preventing removal of said other end of said locking bar from said mounting panel assembly when said mounting panel assembly is secured to said back wall.

5. An electrical panelboard as claimed in claim 4, wherein said locking bar is removably secured to said mounting panel assembly adjacent said other end of said locking bar by means including a screw inserted from the rear of said mounting panel assembly.

References Cited in the file of this patent

UNITED STATES PATENTS

| | | |
|---|---|---|
| 2,883,587 | Dorfman | Apr. 21, 1959 |
| 2,902,632 | Stanback | Sept. 1, 1959 |
| 2,910,630 | Hammerly | Oct. 27, 1959 |
| 2,946,928 | Slade | July 26, 1960 |